Figure 1:
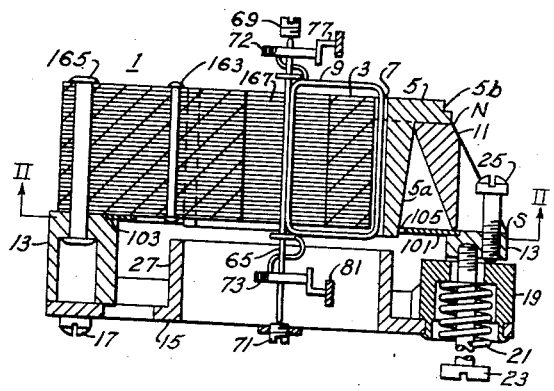

INVENTOR
Veron S. Thomander
BY C. L. Freedman
ATTORNEY

Patented July 4, 1950

2,513,900

UNITED STATES PATENT OFFICE 2,513,900

MOVING COIL INSTRUMENT WITH MAGNETIC COMPENSATING SHUNTS

Veron S. Thomander, Maplewood, N. J., assignor to Westinghouse Electric Corporation, East Pittsburgh, Pa., a corporation of Pennsylvania Application October 22, 1946, Serial No. 704,837

12 Claims. (Cl. 171—95)

This invention relates to permanent-magnet devices, and it has particular relation to permanent-magnet moving-coil instruments suitable for response to various electrical quantities.

Permanent-magnet moving-coil instruments are employed for various purposes, such as for relaying and for measuring various electrical quantities such as current and voltage. Although the invention is desirable for permanent-magnet moving-coil instruments employed for all of these purposes, it has particular advantages for instruments employed as milli-voltmeters.

Permanent-magnet moving-coil instruments are subject to a number of temperature errors. Such errors may result from variations in permeability of the magnet structure employed in the instrument, but the errors are primarily caused by changes in resistance of the moving coil and in the bronze springs commonly employed for conducting current to and from the moving coil. If the moving coil is constructed of copper wire, an increase in temperature results in an increase in the resistance of the moving coil and of the bronze springs associated therewith. Such an increase in resistance produces a decrease in current flowing through the moving coil when the moving coil is energized from a constant voltage source. The resulting decrease in current may cause the instrument to indicate an abnormally low value for the voltage being measured.

Instruments of the foregoing types often are required to operate in surroundings wherein the ambient temperature may vary over a substantial range, such as from 0° F. to a temperature in excess of 100° F. In order to minimize the errors resulting from temperature changes in instruments subject to variations in ambient temperature, it is the practice to employ resistance in series with the moving coil of the instrument. Such a resistance has a negligible variation of resistance over the entire range of ambient temperature and has a value of resistance substantially larger than that of the associated coil and bronze springs.

In accordance with the invention, a permanent-magnet device is provided with means for controlling variations in the permanent-magnet device resulting from changes in ambient temperature. To this end, the permanent magnet is provided with a magnetic shunt having a permeability which varies as a function of temperature over the ambient temperature range to which the permanent-magnet device is to be subjected. As applied to a permanent-magnet moving-coil instrument, the magnetic shunt preferably has a configuration corresponding to the configuration of the air-gap within which the moving coil is mounted for rotation. In a permanent-magnet, moving-coil instrument having an arcuate pole-piece surrounded by a permanent magnet, the magnetic shunt preferably is in the form of an annular magnetic element concentric with the permanent magnet and the pole-piece. Conveniently, the shunt may be located between a pole-face of the permanent magnet and an associated magnetic member employed for conducting magnetic flux from the permanent magnet to or from the air-gap of the instrument.

It is, therefore, an object of the invention to provide an improved permanent-magnet device which is inherently free of errors resulting from variations in ambient temperature.

It is another object of the invention to provide a permanent-magnet moving-coil instrument with a magnetic shunt constructed of material capable of compensating the instrument for errors introduced by variations in ambient temperature, wherein the magnetic shunt is configured to minimize any disturbance of the magnetic flux distribution in the air-gap of the instrument.

It is an additional object of the invention to provide a permanent-magnet moving-coil instrument having a magnetic pole-piece nested within an arcuate permanent magnet with an annular magnetic shunt having a magnetic permeability which varies substantially with temperature.

It is a still further object of the invention to provide an annular magnetic shunt which is interposed between the pole-face of a permanent magnet and an adjacent magnetic member.

Figure 2:
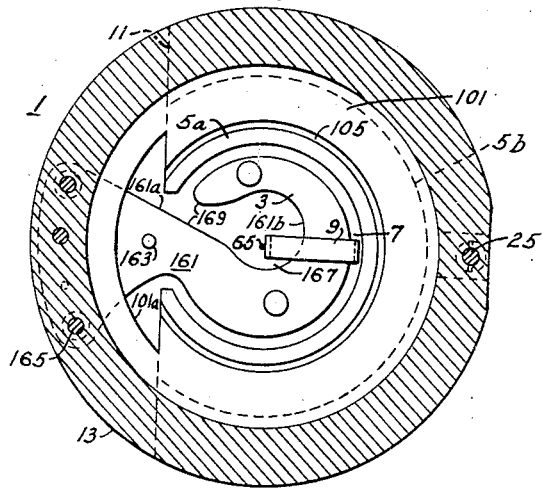

Other objects of the invention will be apparent from the following description, taken in conjunction with the accompanying drawing, in which:

Figure 1 is a view, in sectional elevation, of a permanent-magnet moving-coil instrument embodying the invention; and Fig. 2 is a view, in section, taken along the line II—II of Fig. 1.

Figure 1 shows a permanent-magnet moving-coil instrument wherein a magnetic structure 1 is provided which includes an inner magnetic core 3, which is part of an inner pole-piece, and an outer magnetic pole-piece 5. These magnetic pole-pieces are spaced to define an air-gap 7 within which one side of a coil 9 is disposed for rotation. Although the configurations of the surfaces of the pole-pieces which define the air-gap may vary in accordance with the magnetic field distribution desired, it is assumed for the purpose of discussion that the surfaces are substantially cylindrical and concentric about the axis of rotation of the coil 9.

For producing a magnetic field in the air-gap 7, a permanent magnet 11 is provided which has one pole-face in engagement with the outer magnetic pole-piece 5. The remaining pole-face of the permanent magnet 11 is connected through a magnetic ring 13 to the core 3.

In order to adjust the magnetic field produced in the air-gap 7, a calibrator or magnetic shunt 15 may be provided if desired. This magnetic shunt has one end attached to the magnetic ring 13 by means of suitable screws 17. The shunt may be arranged for adjustment in any suitable manner. In the specific embodiment shown, the opposite end of the magnetic shunt is provided with a cup 19 for receiving a compression spring 21. This compression spring is compressed by means of a screw 23 which is in threaded engagement with the ring 13. By inspection of Fig. 1, it will be observed that the spring urges the right-hand end of the magnetic shunt 15 toward the ring 13. Adjustment of the magnetic shunt is effected by a machine screw 25 which passes through a threaded opening in the ring 13 and abuts against a wall of the cup 19. The screws 23 and 25 may be formed of a suitable non-magnetic material such as brass. By rotation of the screw 25, the shunt may be displaced relative to the ring to vary the position of a cylindrical sleeve 27 formed on the shunt relative to the inner pole-piece 5. Consequently, manipulation of the screw 25 varies the amount of flux shunted away from the air-gap 7.

Returning now to the coil 9, it will be observed that the coil is mounted on a shaft 65. This shaft is mounted between a pair of bearing screws 69 and 71 for rotation relative to the magnetic structure 1. In addition to the coil 9, the shaft 65 carries a pair of spiral springs 72 and 73 which are employed not only to bias the coil 9 toward a predetermined position with respect to its magnetic structure but also to connect electro-conductively the terminals of the coil 9 to an external electrical circuit (not shown). By inspection of Fig. 1, it will be observed that the outer end of the spring 72 is attached to a support 77. In a similar manner, the outer end of the spring 73 is soldered to a lug 81.

It will be observed that the inner magnetic core 3 forms a portion of a hook unit 161 having a shank section 161a and a hook section 161b (see Fig. 2). This hook unit 161 may be formed of solid metal but preferably is formed of a plurality of laminations which are united in any suitable manner as by means of rivets 163. The hook unit may be secured to the ring 13 in any desired manner as by means of additional rivets 165. The outer pole-piece 5 has a cylindrical or tubular section 5a which is spaced from the inner core 3 to define the air-gap 7. A ring-shaped flange 5b projects from the cylindrical section for engaging one pole-face of the permanent magnet 11.

The hook unit 161, the outer magnetic pole-piece 5 and the ring 13 may be formed of any suitable magnetic material having good magnetic permeability, such as soft iron or steel.

If the magnet 11 is formed of one of the aluminum-nickel alloys, it may be silver-soldered to the outer pole-piece 5 and to the ring 13. The permanent magnet 11 is suitably spaced from the cylindrical section 5a of the outer pole-piece, and preferably the sides of the permanent magnet are inclined. In the preferred embodiment, the permanent magnet 11 has the form of a segment of a frustum of a right circular cone. The permanent magnet 11 is magnetized along a slant height to provide pole-faces which are in the form of rings concentric about the axis of rotation of the coil 9. For the purpose of illustration, the upper pole-face in Fig. 1 is designated a north pole-face N, whereas the lower pole-face is designated a south pole-face S. It will be observed that the magnet 11 is somewhat U-shaped, and has inner and outer surfaces which are portions of concentric conical surfaces.

The pole faces N and S of the permanent magnet 11 lie in parallel, spaced planes. The pole-piece 5 has a portion or section 5a positioned substantially between these planes, and has a portion in the form of a flange 5b adjacent the pole-face N.

As shown more particularly in Fig. 2, the hook unit 161 has an axial opening 167 extending therethrough which is eccentrically located with respect to the outer cylindrical surface of the inner core 3. The opening 167 is so positioned that the hook section 161b has a cross-section which tapers from a large value adjacent the shank section 161a to a smaller value distant from the shank section. Since all of the magnetic flux passing through the air-gap 7 also passes through the shank section 161a, it follows that the total flux in the hook section 161b decreases from a large value adjacent the shank section to a smaller value distant from the shank section. Consequently, the flux density is maintained at a reasonably low value at any point in the hook section 161b despite its tapering configuration. This construction assures efficient utilization of magnetic material and, in addition, provides a maximum size of the opening 167 to facilitate entry and removal of the coil assembly therethrough. The tip of the hook section 161b is terminated at a point displaced from the shank section by a distance sufficient to provide a channel 169 large enough to pass the coil 9 when the coil assembly is introduced in or removed from the core 3. The outer magnetic pole-piece 5 and the magnet 11 terminate along a chordal plane to provide ample room for passage of the coil assembly and to prevent excessive magnetic leakage between the outer pole-piece 5 and the shank 161a.

Except for the changes hereinafter set forth, the instrument illustrated in the drawing and described above is similar to the instrument shown and described in my Patent No. 2,389,393. For a more detailed description of the instrument, reference may be made to my aforesaid patent.

As previously pointed out, instruments of the type herein discussed may be subject to ambient temperatures which vary, for example, from 0° F. to temperatures in excess of 100° F. In order to compensate the instrument against errors resulting from such changes in ambient temperature, a magnetic shunt 101 is provided for shunting magnetic flux away from the air-gap 7. This shunt is so configured that it introduces substantially no distortion in the distribution of magnetic flux in the air-gap 7. In accordance with the invention, the shunt may take the form of a ring or annular element which is clearly shown in Fig. 2 of the drawing. Conveniently, the shunt may be punched from a sheet of material having the required magnetic properties. Materials having permeabilities which vary appreciably as a function of temperature are well-known in the art. For example, a discussion of suitable magnetic alloys will be found on pages 16, 17 and 18 of a pamphlet entitled Nickel-Alloy Steels, Section 4, Data Sheet No. 2, published in 1938 by the International Nickel Company, Inc., of New York city.

An unusually convenient mounting for the magnetic shunt 101 may be provided by interposing the shunt between the magnetic ring 13 and the associated pole-face of the permanent magnet 11. Preferably, an annual groove 103 is cut in the ring 13 for reception of the rim of the magnetic shunt 101.

It will be recalled that the permanent magnet 11 may be soldered to the magnetic ring 13. Although such soldering alone may unite the parts sufficiently to retain the magnetic shunt 101 in position, soldering may be simultaneously employed for securely attaching the magnetic shunt 101 to the associated permanent magnet and magnetic ring. With the association of parts illustrated clearly in Fig. 1, a single soldering operation suffices for uniting the permanent magnet, the magnetic shunt, and the magnetic ring.

It will be noted that the magnetic shunt 101 extends between the magnetic ring 13 and the section 5a of the pole-piece 5. Depending on the reluctance of the material employed for the magnetic shunt, the magnetic shunt may engage the section 5a or may be spaced therefrom to provide an air-gap therebetween. In the preferred embodiment of Figs. 1 and 2, the magnetic shunt 101 is formed of an austenitic iron-nickel alloy containing approximately 30% nickel and is spaced from the section 5a to provide an annular air-gap 105 therebetween.

As shown in Fig. 1, the pole-piece 5 and the magnetic shunt 101 establish a series magnetic path which includes the air-gap 105 across the pole-faces of the permanent magnet 11. As the temperature of the instrument increases, the reluctance of the magnetic shunt 101 also increases and the resulting magnetic flux passing through the series magnetic path established by the pole-piece 5 and the magnetic shunt 101 decreases. This means that a larger proportion of the magnetic flux from the permanent magnet 11 is directed across the air-gap 7. The variation in the magnetic field intensity of the air-gap 7 consequently is in a direction suitable for compensating the instrument for errors resulting from an increase in the resistance of the coil 9 and of the bronze springs 72 and 73 caused by the rise in ambient temperature. By suitable proportioning of the various parts, the instrument shown in the drawing can be inherently free of error resulting from variations in ambient temperature.

Unusual uniformity of magnetic flux distribution is obtained in the air-gap 7 of the instrument shown in Figs. 1 and 2. It will be noted that the pole-pieces 3 and 5, the permanent magnet 11, the cylindrical sleeve 27 and the magnetic shunt 101 all are concentric about the axis of rotation of the coil 9. The resulting symmetry assures uniform magnetic flux distribution in the air-gap 7. At the same time, the nested relationships of the pole-pieces and the permanent magnet 11 together with the location of the magnetic shunt 101 to surround the section 5a results in an extremely compact instrument. If desired, the annular magnetic shunt 101 may have a portion 101a of reduced width adjacent the shank section 161a. This provides a greater clearance for the moving coil assembly during its insertion in the associated magnetic structure and its removal therefrom in the manner discussed in my aforesaid patent.

Although the invention has been discussed with reference to certain specific embodiments thereof, numerous modifications are possible. All modifications incorporating the invention are intended to be covered by the appended claims.

I claim as my invention:

1. In a permanent-magnet device, a magnetic structure having first and second magnetic pole pieces, said pole pieces comprising a substantially tubular magnetic pole-piece, and a substantially cylindrical magnetic pole-piece nested within the tubular magnetic pole-piece, said pole-pieces being spaced to define an arcuate air-gap, a permanent magnet having a first pole magnetically connected to the first magnetic pole-piece, said permanent magnet having a second pole magnetically connected to the second magnetic pole-piece, and a temperature-responsive magnetic member extending between the first pole of the permanent magnet and the second magnetic pole-piece for shunting magnetic flux away from the air-gap, said member having a configuration corresponding to the configurations of the associated magnetic pole-piece and the permanent magnet.

2. In a permanent-magnet device, first and second spaced magnetic units each providing one of a pair of substantially annular magnetic seats concentric about a common axis and spaced axially along said axis, an arcuate permanent magnet extending between said magnetic seats, said permanent magnet having pole-faces engaging said seats and conforming in shape thereto, said first magnetic unit comprising a substantially cylindrical magnetic pole-piece positioned substantially within the permanent magnet and magnetically connected to the magnetic seat of the first magnetic unit, said second magnetic unit comprising a tubular magnetic pole-piece magnetically connected to the magnetic seat of the second magnetic unit and substantially surrounding the cylindrical magnetic pole-piece to define therebetween an arcuate air-gap supplied with magnetic flux by the permanent magnet, and a temperature-responsive magnetic element extending between said magnetic units for shunting magnetic flux away from said air-gap.

3. In a permanent-magnet device, first and second spaced magnetic units each providing one of a pair of substantially annular magnetic seats concentric about a common axis and spaced axially along said axis, a permanent magnet extending between said magnetic seats, said permanent magnet having pole-faces engaging said seats and conforming in shape thereto, said first magnetic unit comprising a substantially cylindrical magnetic pole-piece positioned substantially within the permanent magnet and magnetically connected to the magnetic seat of the first magnetic unit, said second magnetic unit comprising a tubular magnetic pole-piece magnetically connected to the magnetic seat of the second magnetic unit and substantially surrounding the cylindrical magnetic pole-piece to define therebetween an arcuate air-gap supplied with magnetic flux by the permanent magnet, a coil having a side disposed in said air-gap, means mounting the coil for rotation relative to the magnetic units, and a magnetic element constructed of material having a negative temperature coefficient of permeability for by-passing magnetic flux from the permanent magnet away from the air-gap, said magnetic element having a substantially annular configuration magnetically connected to the first magnetic unit adjacent the magnetic seat of the first magnetic unit and extending toward and substantially surrounding said tubular magnetic pole-piece.

4. In a permanent-magnet device, a permanent magnet shaped substantially as a segment of the frustrum of a hollow right circular cone, said permanent magnet having substantially annular pole-faces in planes perpendicular to and spaced along the axis of the cone, a substantially tubular magnetic pole-piece magnetically connected to the smaller diameter pole-face and nested substantially within the permanent magnet, and a substantially annular magnetic element constructed of material having a negative temperature coefficient of permeability magnetically connected to the larger diameter pole-face, said annular magnetic element substantially surrounding the tubular magnetic pole-piece and establishing with the pole-piece a series magnetic path across the pole-faces of the permanent magnet.

5. In a permanent-magnet device, a permanent magnet shaped substantially as a segment of the frustrum of a hollow right circular cone, said permanent magnet having substantially annular pole-faces in planes perpendicular to and spaced along the axis of the cone, a substantially tubular magnetic pole-piece magnetically connected to the smaller diameter pole-face and nested substantially within the permanent magnet, a substantially annular magnetic element constructed of material having a negative temperature coefficient of permeability magnetically connected to the larger diameter pole-face, said annular magnetic element substantially surrounding the tubular magnetic pole-piece and establishing with the pole-piece a series magnetic path across the pole-faces of the permanent magnet, an inner magnetic pole-piece magnetically connected to the larger diameter pole-face and disposed within the tubular magnetic pole-piece, said pole-pieces being spaced to define an arcuate air-gap supplied with magnetic flux by the permanent magnet, a coil having a side disposed in the air-gap, and means mounting the coil for rotation about an axis relative to the pole-pieces.

6. In a permanent-magnet device, a permanent magnet shaped substantially as a segment of the frustrum of a hollow right circular cone, said permanent magnet having substantially annular pole-faces in planes perpendicular to and spaced along the axis of the cone, a substantially tubular magnetic pole-piece magnetically connected to the smaller diameter pole-face and nested substantially within the permanent magnet, a substantially annular magnetic element constructed of material having a negative temperature coefficient of permeability magnetically connected to the larger diameter pole-face, said annular magnetic element substantially surrounding the tubular magnetic pole-piece and establishing with the pole-piece a series magnetic path across the pole-faces of the permanent magnet, an inner magnetic pole-piece magnetically connected to the larger diameter pole-face and disposed within the tubular magnetic pole-piece, said pole-pieces being spaced to define an arcuate air-gap supplied with magnetic flux by the permanent magnet, a coil having a side disposed in the air-gap, means mounting the coil for rotation about an axis relative to the pole-pieces, and an adjustable magnetic shunt establishing a magnetic path between the larger diameter pole-face and said tubular magnetic pole-piece, the tubular magnetic pole-piece and the portions of the magnetic shunt and the annular magnetic element adjacent thereto being substantially concentric about said axis.

7. In a permanent-magnet device, a magnetic ring, an arcuate permanent magnet having a first pole-face adjacent a portion of the magnetic ring and having a second pole-face, said magnetic ring and the permanent magnet being concentric about a common axis, and magnetic means controlling the path of magnetic flux flowing between the pole-faces of said permanent magnet, said magnetic means including a substantially annular magnetic element having a substantially circular rim interposed between the permanent magnet and said magnetic ring, a substantially tubular magnetic pole-piece disposed substantially within the magnetic element and the permanent magnet, said tubular magnetic pole-piece and the magnetic element establishing a series magnetic path across the pole-faces of the permanent magnet, an inner magnetic pole-piece magnetically connected to said magnetic ring and disposed substantially within the tubular magnetic pole-piece for defining between the pole-pieces an arcuate air-gap, said pole-pieces, said magnetic ring, the magnetic element and the permanent magnet having arcuate configurations substantially concentric about a common axis, a coil having a side disposed in the air-gap, and means mounting the coil for rotation about said axis, said magnetic element being constructed of material having a magnetic permeability which varies inversely with temperature in the operating range of temperature of the device.

8. A permanent-magnet device comprising a magnetic structure having two spaced arcuate pole faces which are substantially concentric about an axis to define an air-gap therebetween, said magnetic structure comprising a source of magnetomotive force for directing magnetic flux substantially radially relative to said axis through the air-gap between the pole faces, and temperature-responsive means for shunting magnetic flux from said source of magnetomotive force away from the air-gap, said temperature-responsive means comprising a shunt formed of material having a magnetic permeability which varies as a function of temperature within the operating range of temperature of the device, said shunt having a surface adjacent the air-gap which is substantially concentric with the air-gap.

9. A permanent-magnet device as claimed in claim 8 wherein the source of magnetmotive force comprises a permanent magnet having an arcuate configuration substantially concentric with the air-gap and the pole faces, said temperature-responsive means establishing a shunt path directing magnetic flux through the shunt in substantially the same directions established by magnetic flux traversing said air-gap.

10. A permanent-magnet device as claimed in claim 9 wherein the magnetic structure includes a pair of arcuate pole pieces providing said pole faces, said permanent magnet and one of said pole pieces being in nested substantially concentric relationship relative to the axis.

11. A permanent-magnet device as claimed in claim 8 wherein the magnetic structure includes a pair of arcuate, spaced pole pieces providing said pole faces, and an adjustable magnetic shunt establishing a shunt in parallel with said first-named shunt, said adjustable magnetic shunt having a face adjacent one of said pole pieces which is substantially concentric with the air-gap about said axis.

12. In a permanent-magnet device, a magnetic ring, an arcuate permanent magnet having a first pole face adjacent a portion of the magnetic ring and having a second pole face, said magnetic ring and the permanent magnet being concentric about a common axis, a magnetic element having a substantially circular rim positioned substantially at the junction between the first pole-face and the magnetic ring, and magnetic means cooperating with the magnetic ring and the magnetic element for establishing two parallel paths for magnetic flux produced by the permanent magnet, one of said paths including an air-gap and the other of said paths including said magnetic element, whereby the magnetic element is effective for controlling the magnetic flux traversing the air-gap, said magnetic element having a magnetic permeability which varies as a function of temperature within the operating range of temperature of the device.

VERON S. THOMANDER.

REFERENCES CITED

The following references are of record in the file of this patent:

UNITED STATES PATENTS

| Number | Name | Date |
|---|---|---|
| 1,582,658 | Angus | April 27, 1926 |
| 1,608,872 | Wallis | Nov. 30, 1926 |
| 2,346,683 | Hickok | Apr. 18, 1944 |